W. M. NASH.
AXLE.
APPLICATION FILED NOV. 23, 1908.
945,134.
Patented Jan. 4, 1910.
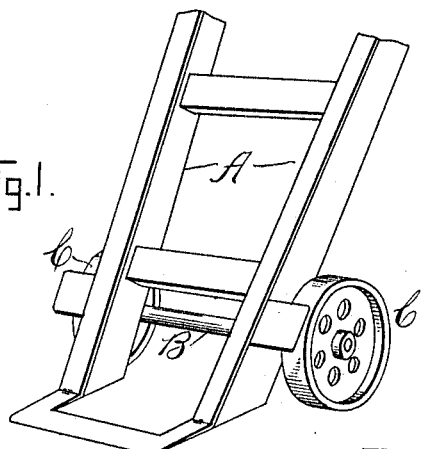
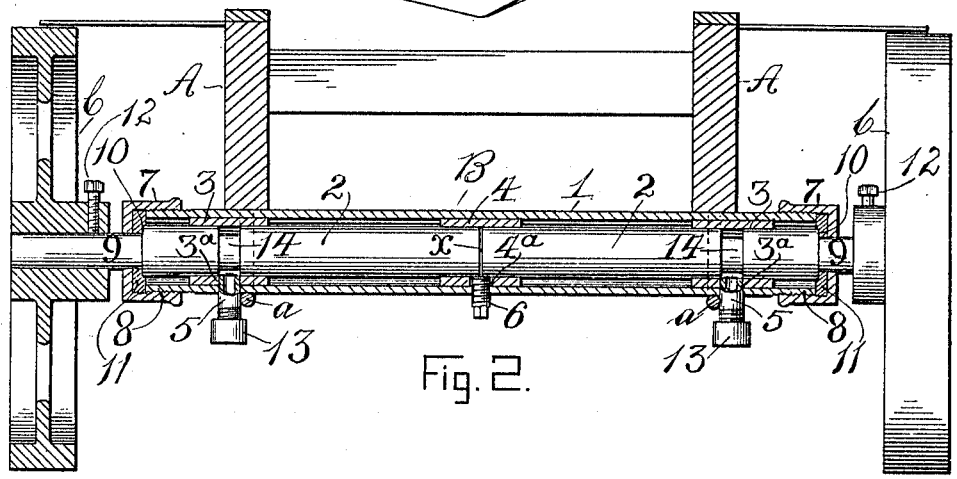
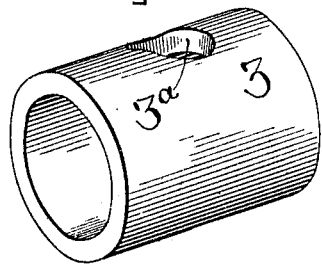
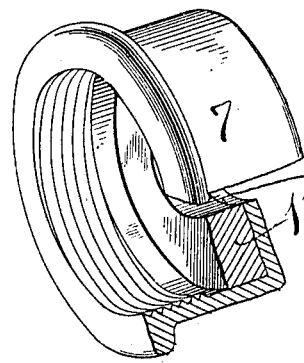
Witnesses
C. K. Reichenbach
Willson H. Knight
Inventor
William M. Nash,
By Knight Bros
Attorneys

UNITED STATES PATENT OFFICE.

WILLIAM M. NASH, OF NORFOLK, VIRGINIA.

AXLE.

945,134.  Specification of Letters Patent.  Patented Jan. 4, 1910.

Application filed November 23, 1908. Serial No. 464,048.

*To all whom it may concern:*

Be it known that I, WILLIAM M. NASH, a citizen of the United States, residing at 122 South Marshall avenue, in the city of Norfolk, county of Norfolk, and State of Virginia, have invented certain new and useful Improvements in Axles, of which the following is a specification.

My invention relates to axles upon which the wheels are keyed or otherwise non-rotatably mounted, and which are themselves rotatably mounted in a plurality of bearings inclosed by a protecting casing, suitably constructed for the supply of, and adapted to confine lubricant required for the bearings.

The object of my invention is to provide an axle of this class having a construction, which while highly effective in attaining the above mentioned purposes of such axles, is economical to produce, durable in use and cheap to maintain, so that it may be used on cheaper grades of vehicles, such as hand trucks, the construction of which must be very cheap, yet capable of withstanding very rough usage.

My invention will be fully understood upon reference to the accompanying drawing in which—

Figure 1 is a perspective view of a portion of a hand truck illustrating one use of my invention. Fig. 2 is a transverse section of a truck such as disclosed in Fig. 1, taken in the plane of the axle and drawn on an enlarged scale. Fig. 3 is a perspective view of one of the three similarly constructed and interchangeable bearings. Fig. 4 is a perspective view partly in section of one of the caps that provide end-closures for the axle casing and confine the axle against outward longitudinal displacement therein.

A represents the side frames or sills of a vehicle such as a hand truck.

B is the axle member of such a vehicle and C are the wheels.

In carrying out my invention, I construct the axle member B of a straight cylindrical casing 1 conveniently provided by a suitable length of drawn iron pipe, threaded at the ends, and with a straight and uniform bore from end to end, and a straight cylindrical true axle 2 located therein, of a sufficiently smaller diameter to leave a considerable space between the axle and the casing and avoid contact between them. These parts are without overlapping offsets or shoulders that prevent introduction or other relative movement of the axle in the casing. The axle is centered within the casing and rotatably supported at points near its ends, and also at the middle, by a series of relatively short, identically constructed and interchangeable bushings 3 and 4 located near the middle and ends. The end-bushings are spaced inward from the end-closures and thus avoid communicating oil to the packings of the latter. These bushings, being short, embrace restricted portions of the axle and while affording ample support to reduce friction, they avoid contact throughout the greater portion of the axle, and being somewhat loosely fitted in the casing, they thus avoid any binding tendency upon the axle in the event of injury to or distortion of the casing. These bearings are preferably of Babbitt-metal, and being of similar construction, and interchangeable, they may be slipped endwise into or out of and to any point within the straight, uniform bore of the casing. The reversal or interchanging of positions is thus provided for, and the replacing of worn bearings is thus facilitated at a minimum cost. They are secured in position by taps 5 and 6 passing through the wall of the casing and entering openings $3^a$ and $4^a$ in the bushings.

For the purpose of hermetically closing the ends of the casing to exclude dust and prevent the escape of lubricant, caps 7 are fitted to the threaded ends 8 of the casing and are provided with reduced central bores $7^a$ (Fig. 4) that fit the reduced shanks 9 of the axle and thereby engage the shoulders 10 of the axle in a direction to prevent outward movement of the axle. The engagement of the axle by the caps is through the medium of packings 11 which also fit the shanks 9, and thrust of the axle against the caps is thereby cushioned. As the shoulders 10 are offset inward from the otherwise uniform diameter of the axle, the lowermost point in the bore of the cap is still considerably higher than the under side of the axle and the cap thus provides an effective dam against the escape of lubricant, even when a considerable body of lubricant is supplied in the casing. Cap 7, in serving to check the flow of lubricant outward, presses the packing 11 not only into intimate contact with the shoulders 10 and end of casing 1, but across the space between said parts, thus causing a tighter joint at the edges of said parts. In thus bridging the space between the axle and the casing; the cap closes the space occupied by the babbits.

The wheels C being secured to the shanks 9 through the medium of set screws 12 or other means suitable to mount the wheels non-rotatably upon the axle, may be spaced apart from the caps, and thus avoid contact between the hubs of the wheels and the caps, which would develop a suction that tends to draw the oil outward.

Lubricating the axle is accomplished by constructing the taps 5 in the form of oil ducts and providing them with screw caps 13. Formed in the axle, in the transverse plane of the oil ducts thus provided, and within, but well overlapped by the babbits, are grooves 14 which serve as oil receptacles. Oil introduced into the receptacles 14 will gradually flow out around the bearings but the receptacles 14 and the ducts 15 nevertheless serve as a means of measuring and restricting the amount of oil introduced at any one time and it is thus necessary only to invert the position of the vehicle and fill the ducts and receptacles. Moreover, this relative position of the ducts and grooves prevents impingement of the axle by the end of the duct should it be inserted too far.

The axle 2 is preferably divided at a point X, of maximum diameter, to permit the necessary acceleration in the rotation of one wheel over the other when the truck is turned in travel. The plane of separation is located within the bush 4 in order to maintain alinement of the two parts of the axle; the parts are thus, in effect, one axle so far as concerns end thrust, and the expense of forging collars on the axle or providing special thrust bearings is entirely avoided; the caps take up all the end thrust.

While located near the ends of the axle, the bushings 3 are preferably placed beneath the sills or frame members A so that the load imposed upon the axle and the gripping effect of the clips *a* or other securing means, is transmitted through the casing and bushing to the axle proper and thus avoids distortion that would be liable to occur from forces applied to an unsupported portion of the casing.

Having thus described my invention, what I claim as new and desire to secure by Letters Patent is:

1. In a vehicle axle, the combination of a cylindrical axle-casing, an axle within said casing of less diameter than the casing and having reduced intermediate portions providing channels, annular bushings overlying said channels and fitting in close contact with the inner surface of said axle-casing, and taps secured in the casing and engaging said bushings whereby to hold the same against axial or rotary movement.

2. In a vehicle axle, the combination of a cylindrical axle-casing, an axle within said casing of less diameter than the casing and having reduced intermediate portions providing channels, annular bushings overlying said channels and fitting in close contact with the inner surface of said axle-casing, tubular taps secured to said casing and having engagement with the bushings whereby to hold said bushings against movement, and caps provided on said taps whereby the same may contain a lubricant for the axle.

3. In a vehicle axle, the combination of a straight cylindrical axle-casing having a uniform bore throughout, an axle in sections within said casing of less diameter than the casing, said axle having reduced outer ends and intermediate portions, said outer reduced portions providing shoulders and wheel shanks and said inner reduced portions providing channels, caps screw-threaded on opposite ends of said axle-casing and having flanges lying in intimate contact with said wheel shanks, packings within said caps lying intermediate said shoulders and said flanges and holding their respective axle sections against longitudinal displacement, annular bushings overlying said inner reduced portions and fitting in close contact with the inner surface of the axle-casing, and taps screw-threaded in said casing and having engagement with said annular bushings whereby to hold the same against rotary or axial movement.

4. In a vehicle axle, the combination of a straight cylindrical axle-casing having a uniform bore throughout, an axle in sections within said casing of less diameter than the casing, said axle having reduced outer ends and intermediate portions, said outer reduced portions providing shoulders and wheel shanks and said inner reduced portions providing channels, caps screw-threaded on opposite ends of said axle-casing and having flanges lying in intimate contact with said wheel shanks, packings within said caps lying intermediate said shoulders and said flanges and holding their respective axle sections against longitudinal displacement, annular bushings overlying said inner reduced portions and fitting in close contact with the inner surface of the axle-casing, tubular taps secured to said casing and having engagement with the bushings whereby to hold said bushings against movement, and caps provided on said taps whereby the same may contain a lubricant for the axle.

The foregoing specification signed at Norfolk, Va., this 24th day of October, 1908.

WILLIAM M. NASH.

In presence of—
J. R. YOUNG,
F. P. GEROW.